(12) United States Patent
Clark

(10) Patent No.: US 10,556,362 B2
(45) Date of Patent: Feb. 11, 2020

(54) TOE NOTCH PLATE

(71) Applicant: Bruce Damon Clark, Fayetteville, GA (US)

(72) Inventor: Bruce Damon Clark, Fayetteville, GA (US)

(*) Notice: Subject to any disclaimer, the term of this patent is extended or adjusted under 35 U.S.C. 154(b) by 0 days.

(21) Appl. No.: 15/396,906

(22) Filed: Jan. 3, 2017

(65) Prior Publication Data

US 2017/0304975 A1 Oct. 26, 2017

Related U.S. Application Data

(60) Provisional application No. 62/275,197, filed on Jan. 5, 2016.

(51) Int. Cl.
 *B27F 1/04* (2006.01)
 *B27C 5/10* (2006.01)

(52) U.S. Cl.
 CPC . *B27F 1/04* (2013.01); *B27C 5/10* (2013.01)

(58) Field of Classification Search
 CPC ...... B27F 1/02; B27F 1/04; B27F 1/08; B27F 1/10; B27F 1/12; B27F 1/14; B25H 1/0078; B27C 5/10; Y10T 409/306216; Y10T 409/306272; Y10T 409/306328; Y10T 409/306384; Y10T 409/30644; Y10T 409/306496; Y10T 409/306552; Y10T 409/306608; B23Q 9/0028; B23Q 9/0035; B23Q 9/0071
 See application file for complete search history.

(56) References Cited

U.S. PATENT DOCUMENTS

| | | | | |
|---|---|---|---|---|
| 2,635,655 A | * | 4/1953 | Linstead | B23Q 9/0028 144/134.1 |
| 3,987,712 A | * | 10/1976 | Croteau | B23Q 35/42 409/131 |
| 5,725,038 A | * | 3/1998 | Tucker | B27C 5/02 144/134.1 |
| 2005/0244240 A1 | * | 11/2005 | Sheffield | B27C 5/10 409/182 |

* cited by examiner

*Primary Examiner* — Matthew Katcoff
(74) *Attorney, Agent, or Firm* — Thomas | Horstemeyer, LLP

(57) ABSTRACT

A toe notch plate is described that attaches to a router and maintains the router at a predefined angle from a work piece. The toe notch plants further maintains a router bit at a consistent and predetermined distance from an edge of the work piece. When the router is moved along the edge of the work piece, the toe notch plate causes a groove to be formed in the work piece, where the groove has a structure suitable for use of a nail gun or a staple gun, and an entry point for nails or staples. This allows the work piece with the groove to be toe nailed to another piece of wood.

20 Claims, 6 Drawing Sheets

TOE NOTCH PLATE

CROSS-REFERENCE TO RELATED APPLICATION

This application claims the benefit of and priority to U.S. Provisional Patent Application No. 62/275,197 entitled "TOE NOTCH PLATE," filed Jan. 1, 2015, the contents of which being incorporated by reference in their entirety herein.

BACKGROUND

With the conventional or current method of attaching a face frame to a cabinet, it is customary to hammer or otherwise drive nails through the face of the cabinet into the body (or carcass) of the cabinet. This attachment method leaves holes in the face frame that have to then be covered with putty and sanded. The filled holes are typically quite noticeable, especially in woods having little or no grain.

BRIEF SUMMARY OF THE INVENTION

A system and method are described herein for fastening a face frame to a carcass from a position behind the face frame. This system and method described herein save time as there is no need to patch nail holes or wait for putty to dry and then sand. Even further, the system and method reduce costs and save money for putty and sandpaper. Beyond saving time, a more secure fastening system is achieved.

A toe notch plate is described that attaches to a standard router and maintains the router at a predetermined angle (e.g., approximately a 75 degree angle) from the work piece. The toe notch plate also maintains the router bit a consistent distance from the edge of the work piece. The toe notch plate may be used with varying thickness of side panels, typically ¾' or ½' thick. When the router is moved along the edge of the work piece, the router will create an angled groove such that the nose of a nail gun can rest in the groove. As may be appreciated, the groove provides stability, consistency, and an entry point for brad nails to enter into the work piece at a low angle, allowing the piece to be toe nailed to another piece of wood, which typically will be perpendicular.

The system and method described herein for attaching a face frame to a cabinet provide a stronger coupling as opposed to nailing through the face into the side panel. Notably, the traditional method of attaching a face frame to the cabinet, requires a nail to go through dense lumber into less dense plywood. There is nothing holding the nail into the less dense plywood. However, in the system and method described herein, the nail goes through less dense plywood into the more dense lumber. To pull apart the face frame, the nail head has to be pulled through the plywood. The system and method described herein provide a finished product that is stronger and more aesthetic than conventional nailing methods, and less cumbersome and time consuming than prior methods.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
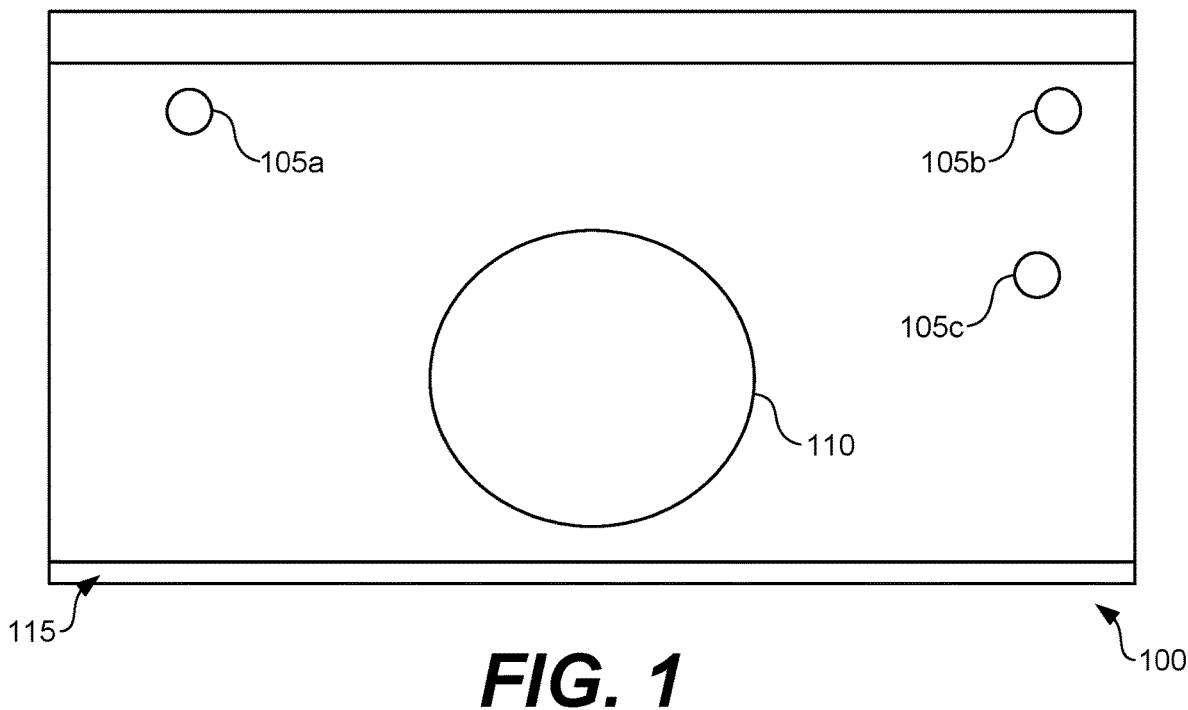
FIG. 1 illustrates a top view of a toe notch plate according to various embodiments of the present disclosure.

Turning now to FIG. 1, a top view of a toe notch plate 100 is shown. The toe notch plate 100 includes router base mounting holes 105a . . . 105c. As may be appreciated, the router base mounting holes 105 may be used to secure the toe notch plate 100 to a router (not shown). Further, the toe notch plate 100 includes a router bit clearance hole 110. A router bit (not shown) of a router may protrude the router bit clearance hole 110, as will be discussed. Also, the second one of the router base mounting holes 105b may be used for 0.75" thick material whereas the third one of the router base mounting holes 105c may be used for 0.5"' thick material. The toe notch plate 100 further comprises an edge guide 115 configured to contact against an edge of a work piece, as will be discussed.

Figure 2:
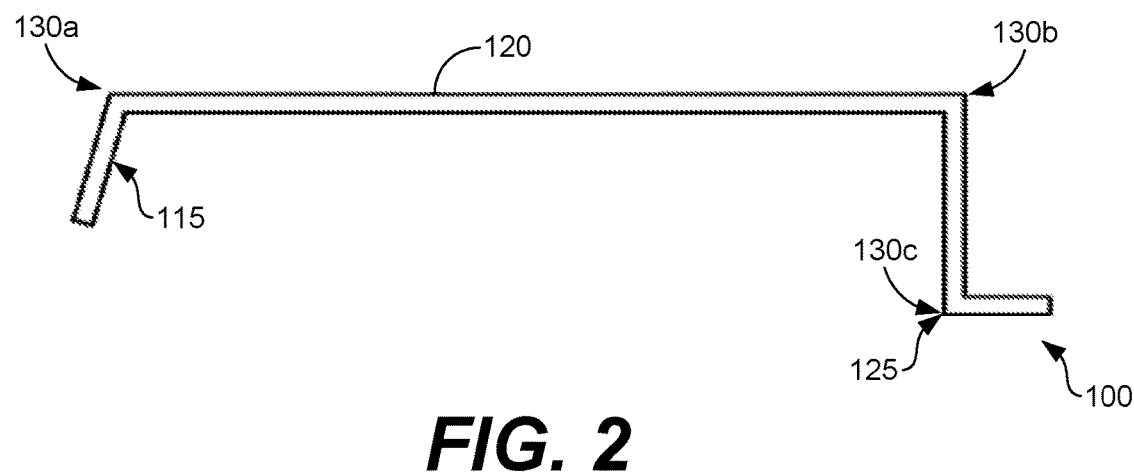
FIG. 2 illustrates an end view of the toe notch plate according to various embodiments of the present disclosure.

Referring next to FIG. 2, an end view of the toe notch plate 100 is shown. The toe notch plate 100 includes a router mounting surface 120, the edge guide 115, and a work piece contact area 125. The work piece contact area 125 may contact a work piece during a cut of a groove, as will be discussed.

Figure 3:
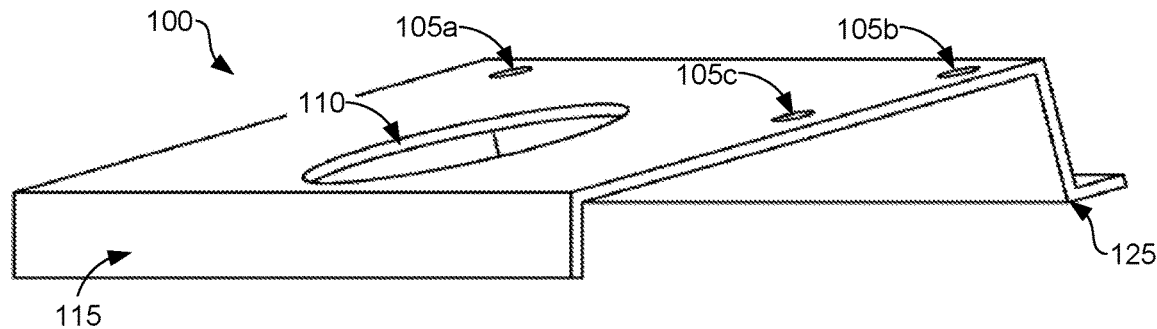
FIG. 3 illustrates a perspective view of the toe notch plate according to various embodiments of the present disclosure.

Moving on to FIG. 3, a three-dimensional perspective view of the toe notch plate 100 is shown. As shown in FIG. 3, the router mounting surface 120 of the toe notch plate 100 slopes downwards at an angle towards the edge guide 115, which assists with formation of a an angled groove as will be discussed.

Figure 4:
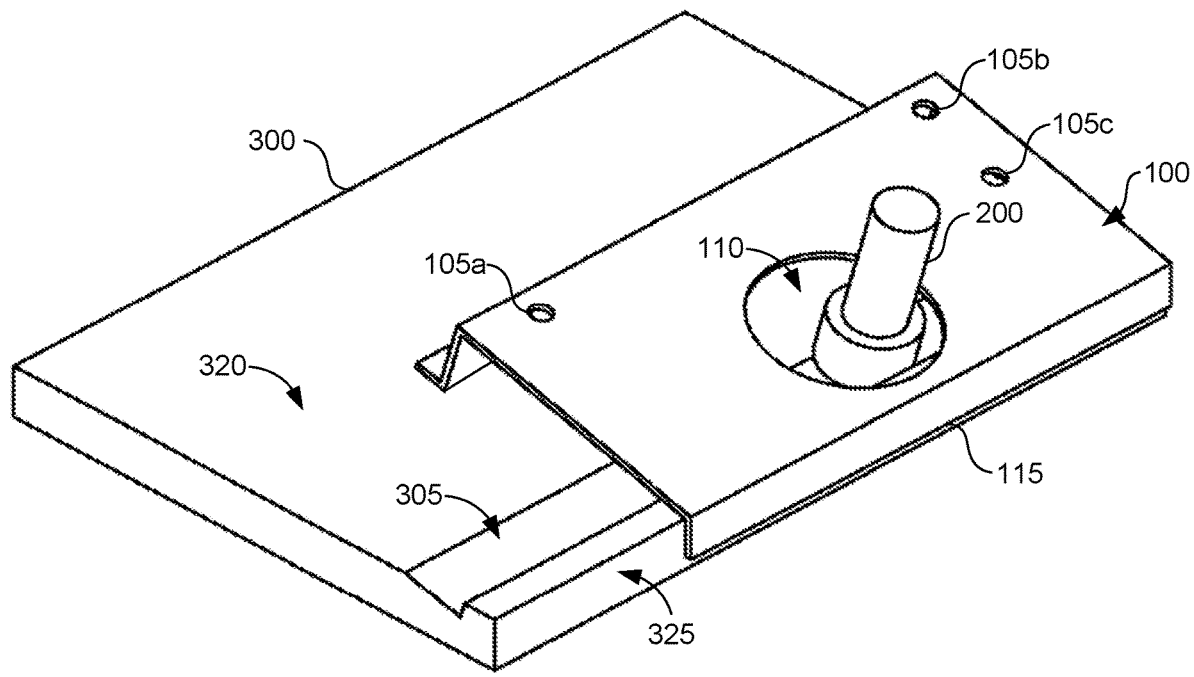
FIG. 4 illustrates another perspective view of the toe notch plate having a router bit in a router bit clearance hole of the toe notch plate according to various embodiments of the present disclosure.

Turning now to FIG. 4, another three-dimensional perspective view of the toe notch plate 100 is shown having a router bit 200 positioned through the router bit clearance hole 110. FIG. 4 also illustrates how the toe notch plate 100 rests on a work piece 300 during formation of a groove 305 in the work piece 300. As shown in FIG. 4, the toe notch plate 100 is configured to position the router bit 200 at a predetermined depth and a predetermined angle relative to a face 320 of the work piece 300 and guide the router to create a groove 305 a predetermined distance from an edge 330 of the work piece 300, for instance, when the router is pulled along the edge of the work piece 300.

Figure 5:
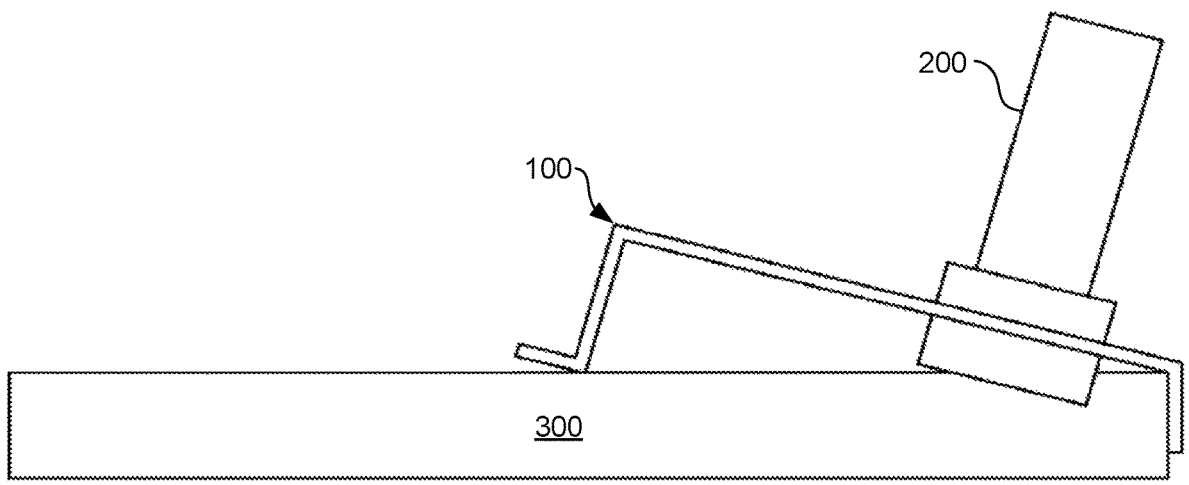
FIG. 5 illustrates a side view of the toe notch plate according to various embodiments of the present disclosure.

Another side view of the toe notch plate 100 is shown in FIG. 5. The work piece 300 is shown along with the toe notch plate 100. The router bit 200 is also shown positioned through the router bit hole 110 while the router is not shown for illustration purposes.

Figure 6:
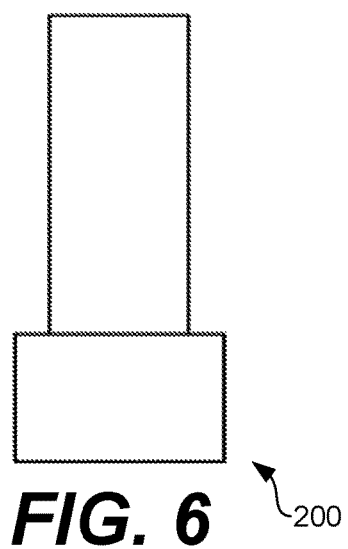
FIG. 6 illustrates a router bit according to various embodiments of the present disclosure.

Referring next to FIG. 6, an example of a router bit 200 is shown as, for example, a standard 0.75" dado bit.

Figure 7:
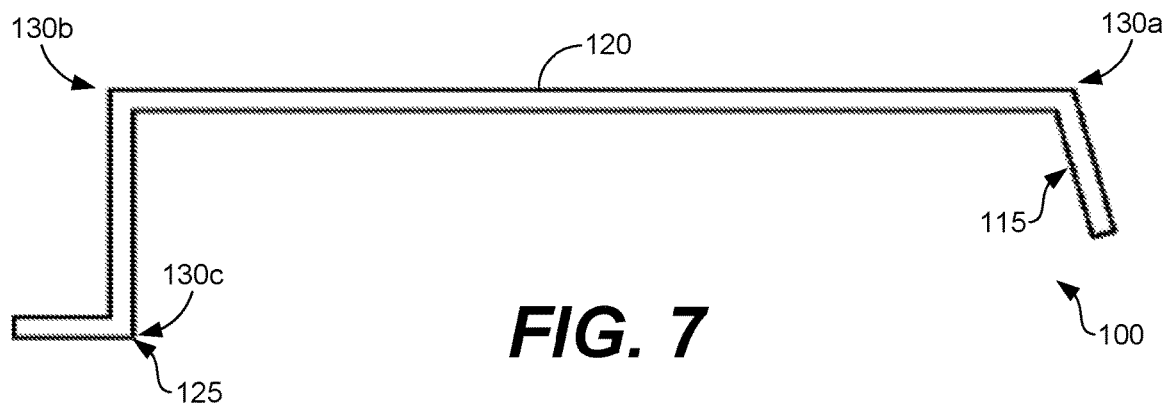
FIG. 7 illustrates an end view of the toe notch plate according to various embodiments of the present disclosure.

Moving on to FIG. 7, an end view of the toe notch plate 100 is shown.

Figure 8:
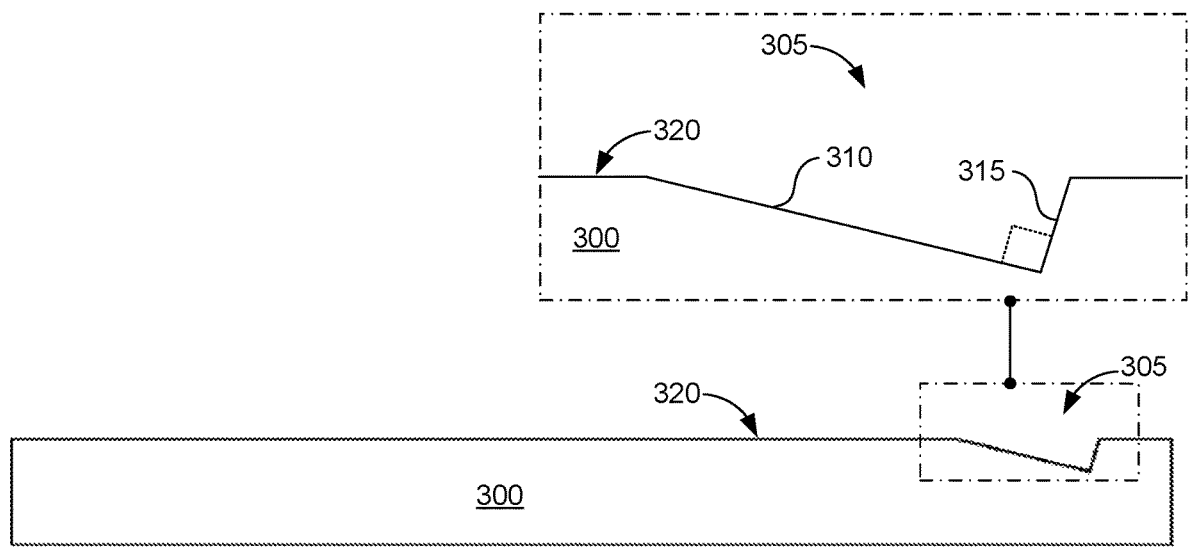
FIG. 8 illustrates a side view of a work piece according to various embodiments of the present disclosure.

Turning now to FIG. 8, a side view of the work piece 300 is shown. The groove 305 is shown as an angled groove that is cut by the router bit 200 when the toe notch plate 100 is used during a cut operation where the groove 305 is formed. A call-out region is also shown that enlarges the view of the groove 305. Notably, the groove 305 comprises a first linear surface 310 and a second linear surface 315 at an angle relative to first linear surface 310 such that a nose of a pneumatic nail gun can rest thereon. As shown in FIG. 8, the first linear surface 310 and the second linear surface 315 are recessed in a face 320 of the work piece 300. A deepest portion of the groove 305 comprises an intersection of the first linear surface 310 and the second linear surface 315.

Figure 9:
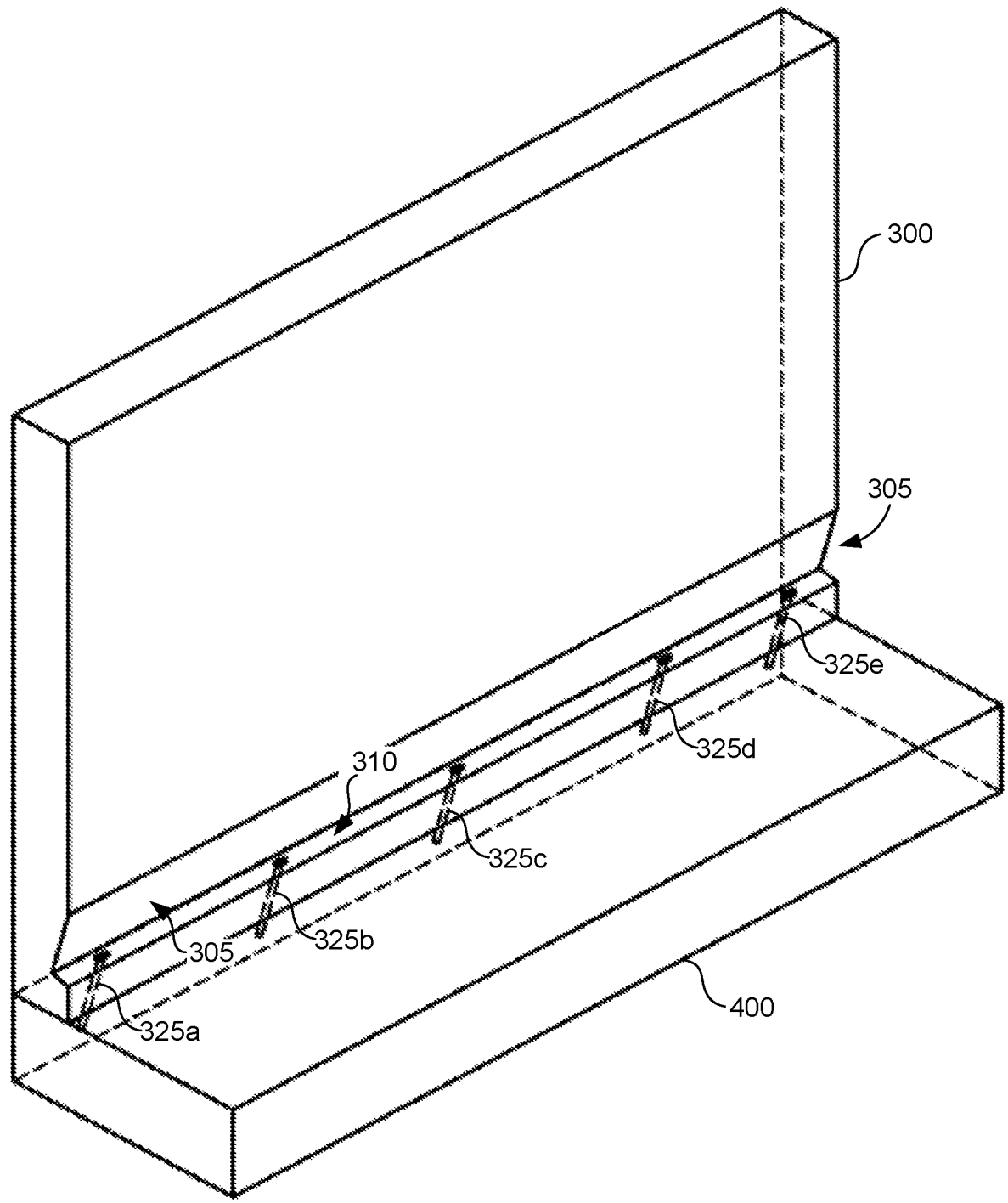
FIG. 9 illustrates a perspective view of the work piece of FIG. 8 attached to the face frame with nails according to various embodiments of the present disclosure.

Referring next to FIG. 9, a three-dimensional perspective view of the work piece 300 is shown attached to a second work piece 400, which may comprise a face frame. Nails 325a . . . 325e are shown positioned through the second linear surface 315 of the groove 305 to attach the work piece 300 to the second work piece 400. As shown in FIG. 9, by virtue of the shape of the groove 305 caused by the toe notch plate 100, the second linear surface 315 has a surface angle and a surface depth sufficient for a nose of a pneumatic nail gun or a nose of a staple gun to rest thereon and provide an entry point for a nail or a staple to secure the work piece 300 to the second work piece 400.

Figure 10:
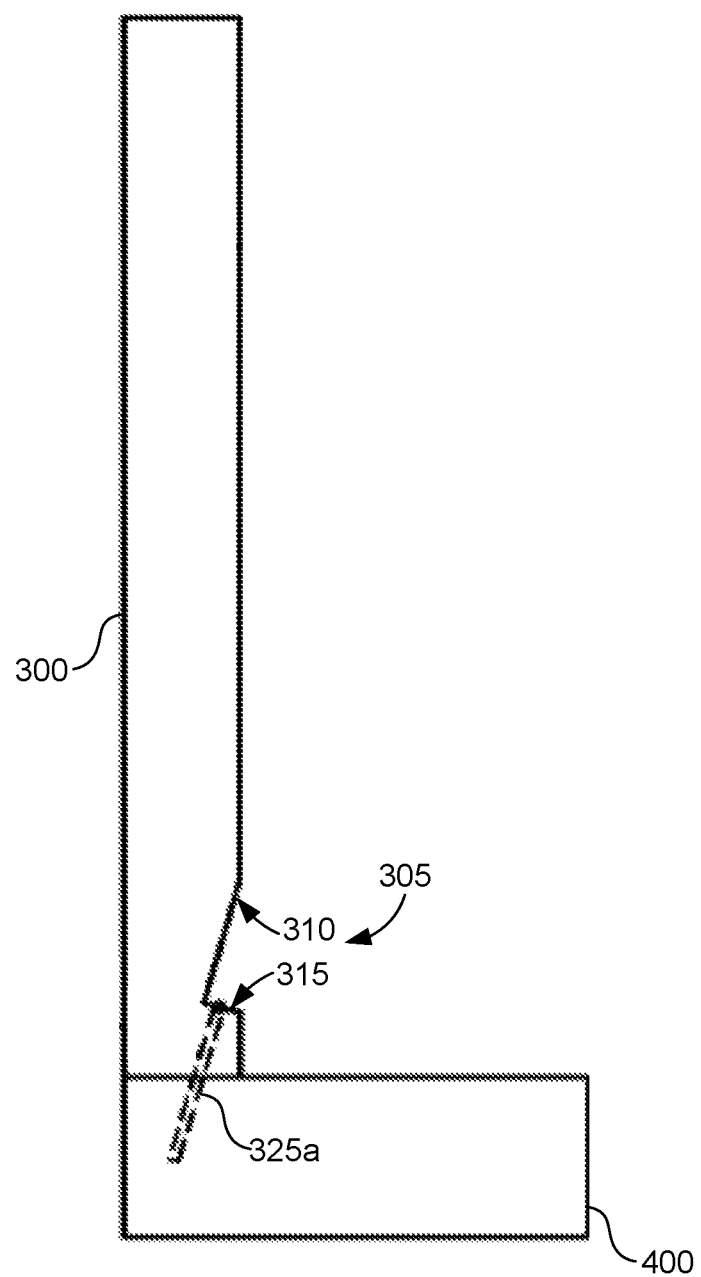
FIG. 10 illustrates another side view of the work piece attached to the face frame according to various embodiments of the present disclosure.

FIG. 10 shows a side view of the work piece 300 attached to the second work piece 400, such as a face frame. A work piece 300 is shown, which for cabinet making will include sides, a top, or a bottom of a cabinet carcass. A nail 325a is shown attaching the work piece 300 to a second work piece 400. The second work piece 400 may include a face frame. The second linear surface 315 shows where a head of a nail gun may rest as well as where the nail 325a enters into the work piece 300.

Referring now to the figures collectively, the toe notch plate 100 may be made of a single piece of sheet metal (or other rigid material). Additionally, the toe notch plate 100 may include bends 130a . . . 130c. For instance, the toe notch plate 100 is illustrated in FIG. 2 and FIG. 7 as having three bends. Also shown in FIG. 2 and FIG. 7, the second one of the bends 130b and the third one of the bends 130c may be 90 degree bends, whereas the first one of the bends 130a may include a bend that forms an angle in the toe notch plate 100 such that the edge guide 115 can rest flatly against an edge of the workpiece. The positions of the bends 130 may cause the router mounting surface 120 to slope downward. Further, as shown in FIG. 1, the toe notch plate 100 may include three router base mounting holes 105a . . . 105c and a large router bit clearance hole 110 for the router bit 200 of a router to pass through. A first one of the bends 130a creates the edge guide 115 and the other two bends 130b, 130c work together to create the work piece contact area 125.

The toe notch plate 100 may typically be mounted to a standard router such as a PORTER-CABLE® router. Alternatively, the toe notch plate 100 may be attached to another type of motor. To this end, the factory sub-base of the router may be first removed by removing the mounting screws (not shown) that hold the sub-base onto the base of the router. Once the screws are removed, the sub-base may be removed and set aside. As may be appreciated, the sub-base will not be needed while the toe notch plate 100 is used. With the router base, the toe notch plate 100 may be placed on and secured to the base of the router with the router mounting surface 120 facing down so that it contacts the base of the router. As the toe notch plate 100 is removable using the screws, the toe notch plate 100 is detachably attachable to the router via the screws.

Using the screws that were removed from the sub-base of the router, a screw is inserted through the first router base mounting hole 105a. If working with 0.75" material, a screw is inserted through the second router base mounting hole 105b. If working with 0.5"' material, a screw is inserted through the third router base mounting hole 105c and all screws are tightened. A 0.75" router bit is installed in the router as per the router manufacturer's procedures.

When working with 0.75" material, the router bit 200 is set so that it extrudes approximately 0.3125" past the toe notch plate 100. When working with 0.5" material, the router bit 200 is set so that it extrudes approximately 0.25" past the bottom surface of the toe notch plate 100.

Once the toe notch plate 100 is attached to the router, a work piece 300 is placed securely on a worktable. With the router on, the edge guide 115 is placed against an edge of the work piece 300 and the work piece contact area 125 on the top of the work piece 300, as shown in FIG. 4. The router (with the toe notch plate 100 attached) is traversed along the desired length of the work piece 300 to create the groove 305, also referred to as a toe notch, as shown in FIG. 8.

Once the groove 305 is formed in the work piece 300, the second work piece 400 (e.g., a face frame) is placed adjacent to the work piece 300, as shown in FIG. 9 and FIG. 10. Thereafter, the nose of a brad or a nail gun is positioned against a nail entry ridge (i.e., the second linear surface 315) and the trigger is pressed to insert a nail 325 through the work piece 300 into the second work piece 400 (e.g., the face frame). As noted above, the toe notch plate 100 may be made out of sheet metal. Alternatively, the toe notch plate 100 may be made out of any hard material, such as plastic or wood. As may be appreciated, the toe notch plate 100 may be used to attach a face frame to a cabinet box, but the toe notch plate 100 may be used in other applications that require a groove 305 (e.g., an angled groove).

The invention claimed is:

1. A system, comprising:
  a router comprising a router bit;
  a plate detachably attachable to the router, wherein the plate comprises:
    an edge guide configured to contact an edge of a work piece;
    a router mounting surface comprising a router bit clearance hole through which the router bit is configured to be positioned
    a work piece contact area configured to contact a face of the work piece, the work piece contact area comprising a first planar surface and a second planar surface;
    a first bend that connects the edge guide and the router mounting surface at an angle such that the edge guide is configured to rest flatly against an edge of the work piece while the work piece contact area is contacting the face of the work piece;
    a second bend that connects the router mounting surface and the first planar surface of the work piece contact area; and
    a third bend that connects the first planar surface and the second planar surface of the work piece contact area;

wherein the plate is configured to position the router bit at a predetermined depth and a predetermined angle relative to a face of a work piece and guide the router to create a groove a predetermined distance from an edge of the work piece when the router is pulled along the edge of the work piece;

wherein the predetermined angle of the router bit causes the groove to comprise a first linear surface and a second linear surface perpendicular to the first linear surface, the first linear surface and the second linear surface being recessed in the face of the work piece; and wherein the second linear surface has a surface angle and a surface depth sufficient for a nose of a pneumatic nail gun to rest thereon and provide an entry point for a nail or a staple to secure the work piece to another piece.

2. The system of claim 1, wherein the second bend is a 90 degree bend.

3. The system of claim 2, wherein the third bend is a 90 degree bend.

4. The system of claim 1, wherein the router bit is a 0.75 inch router bit.

5. The system of claim 1, wherein the router is configured such that the router bit protrudes approximately 0.3125" or approximately 0.35" past a bottom surface of the plate.

6. The system of claim 1, wherein the router comprises a fixed-base router.

7. The system of claim 1, further comprising a sub-base of the router that is removable from the router.

8. The system of claim 1, wherein a deepest portion of the groove comprises an intersection of the first linear surface and the second linear surface.

9. The system of claim 1, wherein the plate comprises metal.

10. The system of claim 1, wherein the plate comprises plastic.

11. The system of claim 1, wherein the plate comprises wood.

12. A toe notch plate configured to attach to a router and guide the router to form a groove in a work piece, the toe notch plate comprising:

a plate detachably attachable to the router, wherein the plate comprises:

an edge guide configured to contact an edge of a work piece;

a router mounting surface comprising a router bit clearance hole through which a router bit of the router is configured to be positioned;

a work piece contact area configured to contact a face of the work piece, the work piece contact area comprising a first planar surface and a second planar surface;

a first bend that connects the edge guide and the router mounting surface at an angle such that the edge guide is configured to rest flatly against an edge of the work piece while the work piece contact area is contacting the face of the work piece;

a second bend that connects the router mounting surface and the first planar surface of the work piece contact area; and a third bend that connects the first planar surface and the second planar surface of the work piece contact area;

wherein the plate is configured to position the router bit at a predetermined angle relative to a face of a work piece and guide the router to create a groove a predetermined distance from an edge of the work piece when the router is pulled along the edge of the work piece; and wherein the predetermined angle of the router bit causes the groove to comprise a surface recessed in the face of the work piece, wherein the surface has a surface angle and a surface depth that provides an entry point for a nail to secure the work piece to another piece.

13. The toe notch plate of claim 12, wherein:
the second bend is a 90 degree bend; and
the third bend is a 90 degree bend.

14. The toe notch plate of claim 12, wherein the toe notch plate is configured to attach to a fixed base router.

15. The toe notch plate of claim 12, wherein:
the plate comprises a plurality of holes;
the plate is configured to be secured to the router using a plurality of screws positioned through the plurality of holes of the plate; and
the plate is configured to be secured to the router in place of a removable sub-base of the router.

16. The toe notch plate of claim 12, wherein:
the groove comprises a first linear surface and a second linear surface perpendicular to the first linear surface; and
a deepest portion of the groove comprises an intersection of the first linear surface and the second linear surface.

17. The toe notch plate of claim 12, wherein the plate comprises at least one of: metal, plastic, and wood.

18. The system of claim 1, wherein:
the plate comprises a plurality of holes; and
the plate is secured to the router using a plurality of screws positioned through the plurality of holes of the plate.

19. The system of claim 12, further comprising a sub-base of the router that is removable from the router.

20. The system of claim 12, wherein the router bit is a 0.75 inch router bit.

* * * * *